US010167594B2

(12) United States Patent
Nevalainen et al.

(10) Patent No.: US 10,167,594 B2
(45) Date of Patent: Jan. 1, 2019

(54) METHOD FOR MANUFACTURING BIODEGRADABLE PACKAGING MATERIAL, BIODEGRADABLE PACKAGING MATERIAL AND A PACKAGE OR A CONTAINER MADE THEREOF

(71) Applicant: STORA ENSO OYJ, Helsinki (FI)

(72) Inventors: Kimmo Nevalainen, Kotka (FI); Ville Ribu, Lappeenranta (FI)

(73) Assignee: STORA ENSO OYJ, Helsinki (FI)

( * ) Notice: Subject to any disclaimer, the term of this patent is extended or adjusted under 35 U.S.C. 154(b) by 10 days.

(21) Appl. No.: 14/438,139

(22) PCT Filed: Oct. 28, 2013

(86) PCT No.: PCT/FI2013/051015
§ 371 (c)(1),
(2) Date: Apr. 23, 2015

(87) PCT Pub. No.: WO2014/064340
PCT Pub. Date: May 1, 2014

(65) Prior Publication Data
US 2015/0274367 A1    Oct. 1, 2015

(30) Foreign Application Priority Data
Oct. 26, 2012   (FI) .................................... 20126113

(51) Int. Cl.
D21J 1/08       (2006.01)
D21H 23/22    (2006.01)
(Continued)

(52) U.S. Cl.
CPC ....... *D21H 5/0005* (2013.01); *A47G 19/2205* (2013.01); *B05D 1/265* (2013.01);
(Continued)

(58) Field of Classification Search
None
See application file for complete search history.

(56) References Cited

U.S. PATENT DOCUMENTS 6,183,814 B1    2/2001  Nangeroni et al.
2002/0065345 A1*  5/2002  Narita .................... B32B 27/10
                                                              524/271
(Continued)

FOREIGN PATENT DOCUMENTS

CN    102227459 A    10/2011
EP    1 094 944 B1    9/2004
(Continued)

OTHER PUBLICATIONS

Inego Resin Product Guide—2011.*
(Continued)

*Primary Examiner* — Michael P. Rodriguez
(74) *Attorney, Agent, or Firm* — Patterson Thuente Pedersen, P.A.

(57) ABSTRACT

A biodegradable packaging material, a method of manufacturing the same, as well as products made of the material wherein the manufacture comprises extrusion onto a fibrous substrate one or mote polymer coating layers including at least one layer of a polymer blend consisting of (i) 20-95 wt-% of polylactide having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives. The components of the blend are melted and blended in connection with the extrusion step. The goal is to improve extrudability, increase machine speed in extrusion and maintaining good adhesiveness to the substrate and wood heat-sealability (Continued)

of the coating. The products include disposable drinking cups and board trays, as well as sealed carton packages for solids and liquids.

14 Claims, 6 Drawing Sheets

(51) Int. Cl.

| | | |
|---|---|---|
| B05D 1/26 | (2006.01) | |
| B05D 7/00 | (2006.01) | |
| B32B 27/10 | (2006.01) | |
| B32B 27/36 | (2006.01) | |
| D21H 27/10 | (2006.01) | |
| D21H 19/20 | (2006.01) | |
| D21H 19/28 | (2006.01) | |
| D21H 19/82 | (2006.01) | |
| B32B 37/15 | (2006.01) | |
| B65D 65/46 | (2006.01) | |
| B32B 27/08 | (2006.01) | |
| B32B 27/12 | (2006.01) | |
| B32B 27/30 | (2006.01) | |
| A47G 19/22 | (2006.01) | |
| B65D 1/34 | (2006.01) | |
| B65D 5/62 | (2006.01) | |
| B65D 25/14 | (2006.01) | |
| B32B 27/18 | (2006.01) | |

(52) U.S. Cl.
CPC .............. *B05D 7/58* (2013.01); *B32B 27/08* (2013.01); *B32B 27/10* (2013.01); *B32B 27/12* (2013.01); *B32B 27/18* (2013.01); *B32B 27/308* (2013.01); *B32B 27/36* (2013.01); *B32B 37/153* (2013.01); *B65D 1/34* (2013.01); *B65D 5/62* (2013.01); *B65D 25/14* (2013.01); *B65D 65/466* (2013.01); *D21H 19/20* (2013.01); *D21H 19/28* (2013.01); *D21H 19/82* (2013.01); *D21H 19/824* (2013.01); *D21H 27/10* (2013.01); *B32B 2270/00* (2013.01); *B32B 2307/7163* (2013.01); *B32B 2317/12* (2013.01); *B32B 2439/00* (2013.01); *B32B 2439/02* (2013.01); *B32B 2439/60* (2013.01); *B32B 2439/62* (2013.01); *B32B 2439/66* (2013.01); *B32B 2439/70* (2013.01); *B32B 2553/00* (2013.01); *Y02A 40/961* (2018.01); *Y02W 90/12* (2015.05); *Y02W 90/13* (2015.05); *Y10T 428/3179* (2015.04)

(56) References Cited

U.S. PATENT DOCUMENTS

| | | | |
|---|---|---|---|
| 2004/0248486 A1 | 12/2004 | Hodson | |
| 2005/0151296 A1* | 7/2005 | Obuchi | ................... B32B 27/10 264/171.13 |
| 2012/0201967 A1* | 8/2012 | Skupin | ................... C08L 67/02 427/411 |
| 2014/0147604 A1 | 5/2014 | Nevalainen et al. | |
| 2016/0010281 A1 | 1/2016 | Skupin et al. | |

FOREIGN PATENT DOCUMENTS

| | | | | |
|---|---|---|---|---|
| FI | 20105247 A | | 9/2011 | |
| JP | 2003-128080 | | 5/2003 | |
| WO | WO 2009/064052 A1 | | 5/2009 | |
| WO | WO 2009064052 A1 * | | 5/2009 | .......... C09D 167/02 |
| WO | WO 2010/034712 A1 | | 4/2010 | |
| WO | WO 2010034712 A1 * | | 4/2010 | ............. C08L 67/02 |
| WO | WO 2011/110750 A1 | | 9/2011 | |
| WO | WO 2013/007872 A1 | | 1/2013 | |

OTHER PUBLICATIONS

Technical data sheet for NatureWorks 3051 D—2006.*
PCT/FI2013/050997 ISR and Written Opinion; dated Jan. 2014.*
Application and File History for U.S. Appl. No. 14/438,180, filed Apr. 23, 2015, inventors Kimme Nevalainen et al.
International Search Report and Written Opinion for PCT/FI2013/050997, dated Jan. 23, 2014, 17 pgs.
FI Office Action for Finnish Patent Application No. 20126114, dated Aug. 13, 2013, 6 pgs.
FI Search Report for Finnish Patent Application No. 20126114, dated Aug. 13, 2013, 1 pg.
English and Chinese languages of Shen, "Principles of Polymer Materials Processing", dated Jul. 31, 2000, 15 pages.
English and Chinese language of Office Action for Chinese Application No. 201380067835.2 dated Dec. 25, 2015.
Supplementary European Search Report for European Application No. 13848212.0 dated Jun. 1, 2016.
International Search Report and Written Opinion for PCT/FI2013/051015, dated Jan. 22, 2014. 17 pgs.
FI Office Action for Finnish Patent Application No. 20126113, dated Aug. 13, 2013, 6 pgs.
FI Search Report for Finnish Patent Application No. 20126113, dated Aug. 13, 2013 1 pg.
Ingeo™_Resin Product Guide, © 2011 NatureWorks LLC, 4 pgs.
NatureWorks PLA Polymer 3051D—Injection Molding Process Guide, Jun. 2, 2016, 3 pages.
NatureWorks, Ingeo Biopolymer 3251D Technical Data Sheet—Injection Molding Process Guide, Jun. 2, 2016, 4 pages.
English language translation of Chinese Office Action for Chinese Patent Application No. 201380067786.2, dated Nov. 28, 2016.

* cited by examiner

| a) | PLA2 + PBS | ~ 2 |
|---|---|---|
| | BOARD | ~ 1 |

| b) | PLA2 + PBS | ~ 2 |
|---|---|---|
| | BOARD | ~ 1 |
| | PLA2 + PBS | ~ 2 |

| c) | PLA2 + PBS | ~ 4 |
|---|---|---|
| | PLA1 | ~ 3 |
| | PLA2 + PBS | ~ 2 |
| | BOARD | ~ 1 |

| d) | PLA2 + PBS | ~ 4 |
|---|---|---|
| | PLA1 | ~ 3 |
| | PLA2 + PBS | ~ 2 |
| | BOARD | ~ 1 |
| | PLA2 + PBS | ~ 2 |
| | PLA1 | ~ 3 |
| | PLA2 + PBS | ~ 4 |

| e) | PLA2 + PBAT | ~ 5 |
|---|---|---|
| | PLA1 | ~ 3 |
| | PLA2 + PBS | ~ 2 |
| | BOARD | ~ 1 |

Fig. 6

METHOD FOR MANUFACTURING BIODEGRADABLE PACKAGING MATERIAL, BIODEGRADABLE PACKAGING MATERIAL AND A PACKAGE OR A CONTAINER MADE THEREOF

RELATED APPLICATIONS

This application is a National Phase entry of PCT Application No. PCT/FI2013/051015, filed Oct. 28, 2013, which claims priority from Finland Application No. 20126113, filed Oct. 26, 2012, the disclosures of which are hereby incorporated by referenced herein in their entirety.

FIELD OF THE INVENTION

The present invention is generally related to a method of manufacturing a biodegradable packaging material comprising extrusion onto a fibrous substrate one or more polymer coating layers. The present invention is also generally related to biodegradable packaging material obtained by said method as well as containers and product packages comprising the packaging material according to the present invention.

BACKGROUND OF THE INVENTION

The fibre-based packaging material of product packages, such as packing paper or board, is usually provided with a polymeric coating that makes the package tight and allows closing the package by heat sealing. Similar polymer-coated paper or board is also used for disposable tableware, such as drinking cups. Polyolefins, such as low-density polyethylene (LDPE), are widely used for coating due to their good heat-sealability. A disadvantage of the usual polyolefins is, however, that they are not biodegradable.

Polylactide (PLA), which has reasonably good moisture and gas barrier properties that are sufficient to many applications, has been used as the coating polymer of biodegradable packaging material; however, its use involves a number of problems. Standard low melt index polylactide is stiff and fragile, requiring a high extrusion temperature and a fairly large layer thickness to stick to the fibre substrate of the packaging material. Because of the high temperature, such polylactide runs the risk of deterioration, and in extrusion, the edges of a molten web tend to tear and pin holes easily remain in the extruded layer. This also results in a low machine speed.

To solve the extrusion problems, EP-1094944 B1 discloses an inner adhesion layer, which is coextruded together with an outer polylactide layer, and which consists of a biodegradable polymer, examples of which, according to the specification, include some commercial copolyesters, cellulose esters, and polyester amides.

Another problem with the use of low melt index polylactide in the outer coating layer of the packaging material is its fairly high melting point, and the resulting poor heat-sealability. As an improvement to this, US-2002/0065345 A1 discloses a biodegradable aliphatic polyester that is blended with polylactide, its portion in the mixture being at least 9%, and a tackifier, its portion in the mixture being at least 1%. As suitable aliphatic polyesters, the publication mentions polycaprolactone (PLC) and polybutylene succinate adipate (PBSA). According to the reference, the mixture can be extruded into a film, which can be axially or biaxially stretched, and which can be attached to the fibre substrate by lamination.

In general, adhesivity to a fibrous base and heat-sealability of PLA may be improved by blending with selected polymeric additives, but these have posed various problems limiting their use. There are non-biodegradable polymers, which can only be used in small amounts so as not to spoil the overall biodegradability of the PLA-based coating layer. Other polymers, which are biodegradable, may be used in larger amounts, but even then problems with runnability on the extrusion coating machine may limit their use.

US 2014/0147604 A1 teaches that a coating containing at least 70 weight-% of polylactide and at least 5 weight-% of polybutylene succinate (PBS) or a derivate thereof has an improved adhesion to the fibrous substrate and reduced raw edge penetration (REP). The high share of 70% or more of PLA is necessary for runnability of the extrusion coating process in a coating machine. Therefore, there is an upper limit of 30 wt-% for the share of PBS, even though increasing the PBS share would otherwise be desirable for further improving heat-sealability.

PLA used for coating fibrous packaging materials has usually been low melt index PLA having a melt index at most 25 g/10 min (210° C.; 2.16 kg), due to its suitability for extrusion coating. High melt index PLA is too viscous for being extruded as such but may be turned extrudable by blending with other stiffer polymers.

In WO 2010/034712 A1 there are disclosed polymer coatings on a fibrous base comprising high melt index PLA (NatureWorks 3251 D) blended with polybutylene adipate terephthalate (PBAT). There may also be an amount of other polyesters such as PBS as further components. Both monolayer and multilayer coatings are described, an example of the latter being a structure comprising innermost and outermost layers of PLA blended with PBAT as well as a middle layer, which is said to be either such a blend or mere PLA. However, the teaching of a middle layer of 100% high melt index PLA is in practice unworkable. Low melt index PLA should be used, or PLA should be blended with PBAT to turn the material extrudable. In a working example, the share of PLA in the middle layer is 80% and in the inner and outer layers 60%.

There still remains a need of improving extrudability of the PLA-based polymer blend, while securing improved machine speed in extrusion, good adhesion to the fibrous base, and improved heat-sealing properties of the resulting polymer coated fibrous packaging materials.

These objects should be achieved with improved economy and without compromising environmental aspects of the resulting product.

SUMMARY OF THE INVENTION

The aim of the present inventors was to find an improved method of polymer coating of fibrous packaging material. Particularly the aim has been to improve extrudability of a PLA-based polymer blend while preserving running speed of the paper or board extrusion coating machinery, as well as good adhesivity of the coating to the fibrous substrate and superior heat-sealability.

The solution according to certain aspects of the present invention is extrusion onto a fibrous substrate one or more polymer coating layers including at least one layer of a polymer blend consisting of (i) 20-95 wt-% of polylactide having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives the components of the blend being melted and blended in connection with the extrusion step.

According to certain aspects of the present invention, extrusion onto a fibrous substrate one or more polymer coating layers extruded onto a fibrous substrate includes at least one layer of a polymer blend comprising (i) 20-95 wt-% of polylactide having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives, the components of the polymer blend being melted and blended in connection with an extrusion step.

Blending high melt index PLA with PBS improves extrudability and provides improved adhesion and heat-sealing properties for the blend. Especially as the polymer components are supplied separately as granules, which are blended and melted in connection with the extrusion step, PBS and its derivates have an advantage over PBAT as a blended component. Use of granules permit easy variation of the shares of the components according to the requirements of individual production batches, an advantage over use of premade compounded blends. Use of high melt index PLA allows raising the share of PBS considerably higher than with standard low melt index PLA. As opposed to PBAT, PBS is commercially available as a product made from renewable, non-fossil raw-materials.

According to a certain embodiment of the present invention, the blend is extruded as an outermost heat-sealable layer of a multilayer coating so as to improve heat-sealability of a coated packaging material. According to another certain embodiment of the present invention, the blend is extruded as an innermost adhesive layer of a multilayer coating so as to improve adhesion of the coating onto the fibrous substrate.

A preferable embodiment of the present invention comprises coextrusion onto a fibrous substrate a multilayer coating, the multilayer coating comprising (i) an innermost layer of a blend comprising 20-95 wt-% of high melt index polylactide and 5-80 wt-% of PBS or its derivate, (ii) a middle layer containing low melt index polylactide, and (iii) an outermost layer of a blend comprising 20-95 wt-% of high melt index polylactide and 5-80 wt-% of PBS or its derivate.

According to certain aspects of the present invention, a method comprises coextrusion onto a fibrous substrate a multilayer coating, the multilayer coating comprising (i) an innermost layer of a blend comprising 20-95 wt-% of high melt index polylactide and 5-80 wt-% of PBS or its derivate, (ii) a middle layer containing low melt index polylactide, and (iii) an outermost layer of a blend comprising 20-95 wt-% of high melt index polylactide and 5-80 wt-% of PBS or its derivate.

In certain aspects, the polylactide in the innermost and outermost coating layers is preferably one and the same high melt index polylactide. Even in other respects, the components and their shares may be similar, so that the same polymer blend may be used for both the innermost and the outermost coating layer, which considerably simplifies the coextrusion process.

In the above embodiment, the stiffer layer of low melt index PLA is incorporated as a middle layer of the multilayer structure, to support looser high melt index PLA blend layers and thereby improve their coextrudability. The solution allows sufficient machine speed in the coextrusion process. Use of standard low melt index PLA improves controllability of the extrusion process, while the criticality of the share of high melt index PLA in the inner and outer layers is reduced and there will be enhanced window for varying the respective blends for optimal adhesivity and heat-sealability. In general, use of high melt index PLA allows increasing the share of PBS or its derivate in the blend, thereby enhancing heat-sealing and adhesion properties while preserving runnability of the extrusion machinery.

In addition to high melt index PLA and PBS or its derivate, at most 5 wt-% of other polymeric components may optionally be added to the blend, provided that biodegradability of the coating layer is preserved. Acrylic polymers such as ethylene butyl acrylate glycidyl methacrylate terpolymer (EBAGMA) may be cited as an example of such additives. At least a major part of the coating polymers may be produced from raw materials obtained from essentially biorenewable natural sources.

Another aspect of the present invention is a biodegradable packaging material. According to certain aspects of the present invention, the material comprises a fibrous substrate and one or more extruded polymer coating layers including at least one layer of a polymer blend consisting of (i) 20-95 wt-% of polylactide having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives.

In certain other aspects of the present invention, a biodegradable packaging material comprises a fibrous substrate and one or more extruded polymer coating layers, the one or more extruded polymer coating layers having at least one layer of a polymer blend comprising (i) 20-95 wt-% of polylactide having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives.

Further aspects of the present invention are a drinking cup, a sealed liquid package, a sealed carton package, and a tray package for ready-made food. Characteristic to said products is that they are made of a packaging material manufactured by the method of the present invention or of a packaging material of the present invention as described above. In the case of a disposable drinking cup or a liquid package, the polymer coating is lying at least on the inner liquid-contact side of the cup or package. In a tray, the polymer coating covers at least the upper food-contact side of the tray. In a carton package for dry products, the polymer coating may cover the outer surface of the package, protecting the fibrous substrate and the product against wetting from the outside. However, in each case, the cup, tray or package may be provided with at least one polymer coating layer on both sides of the packaging material.

In certain aspects of the present invention, a method of manufacturing a biodegradable packaging material comprises extruding one or more polymer coating layers onto a fibrous substrate, the one or more polymer coating layers including at least one layer of a polymer blend having (i) 20-95 wt-% of polylactide (PLA) having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives, wherein the components of the blend being melted and blended in connection with the extrusion step.

In certain aspects of the present invention, the polymer blend consists of (i) 30-60 wt-% of said high melt index polylactide, (ii) 40-70 wt-% of polybutylene succinate or a biodegradable derivate thereof, and (iii) 0-5 wt-% of an acrylic copolymer.

In certain aspects of the present invention, the high melt index polylactide has a melt index of 50-100, preferably 70-85 g/10 min (210° C.; 2.16 kg).

In certain aspects of the present invention, the polymer blend is extruded as an outermost heat-sealable layer of a multilayer coating. In certain other aspects of the present invention, the polymer blend is extruded as an innermost adhesive layer of a multilayer coating.

In certain aspects of the present invention, a multilayer coating comprises an innermost layer, a middle layer containing polylactide having a low melt index of 5-35 g/10 min (210° C.; 2.16 kg), and an outermost layer, wherein the innermost layer and the outermost layer comprise a polymer blend having (i) 20-95 wt-% of polylactide (PLA) having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives. In certain aspects, the components of the blend are melted and blended in connection with an extrusion step. In certain other aspects of the present invention, the innermost and the outermost layer of the multilayer coating is the same.

In certain aspects of the present invention, a monolayer coating is extruded into direct contact with the fibrous substrate.

In certain aspects of the present invention, the machine speed in extrusion is at least 100 m/min, in some aspects at least 150 m/min, in some other aspects at least 200 m/min, and in some other most preferable aspects at least 250 m/min.

In certain aspects of the present invention, a biodegradable packaging material comprises a fibrous substrate and one or more extruded polymer coating layers including at least one layer of a polymer blend having (i) 20-95 wt-% of polylactide having a high melt index of more than 35 g/10 min (210° C.; 2.16 kg), (ii) 5-80 wt-% of polybutylene succinate or a biodegradable derivate thereof, and (iii) 0-5 wt-% of one or more polymeric additives.

In certain aspects of the present invention, the packaging material comprises a fibrous substrate and an extruded multilayer coating including innermost and outermost layers of a polymer blend, the innermost and outermost polymer blend layers being (i) 30-60 wt-% of polylactide having a high melt index of 50-100 g/10 min (210° C.; 2.16 kg), (ii) 40-70 wt-% of polybutylene succinate or a derivate thereof, and (iii) 0-5 wt-% of an acrylic copolymer, and a middle layer of polylactide having a low melt index of 5-35 g/10 min (210° C.; 2.16 kg).

In certain aspects of the present invention, the polymer blend layer is provided on the inner liquid-contact side of a drinking cup. In some other aspects, the polymer blend layer is provided on a liquid-contact side of a sealed liquid package. In some other aspects, the polymer blend layer is provided on the outside of a sealed carton package. In still some other aspects, the polymer blend layer is used in a tray package for ready-made food, with the polymer blend layer on the food-contact side of the tray.

The above summary of the various representative aspects and embodiments of the present invention is not intended to describe each illustrated aspect or embodiment or every implementation of the present invention. Rather, the aspects and embodiments are chosen and described so that others skilled in the art can appreciate and understand the principles and practices of the present invention. The figures in the detailed description that follow more particularly exemplify these aspects and embodiments.

BRIEF DESCRIPTION OF THE FIGURES

The invention can be completely understood in consideration of the following detailed description of various aspects and embodiments of the present invention in connection with the accompanying drawings, in which:

FIGS. 6a-6e show as examples structural embodiments of the packaging material according to the present invention.

DETAILED DESCRIPTION OF THE PRESENT INVENTION

Figure 1:
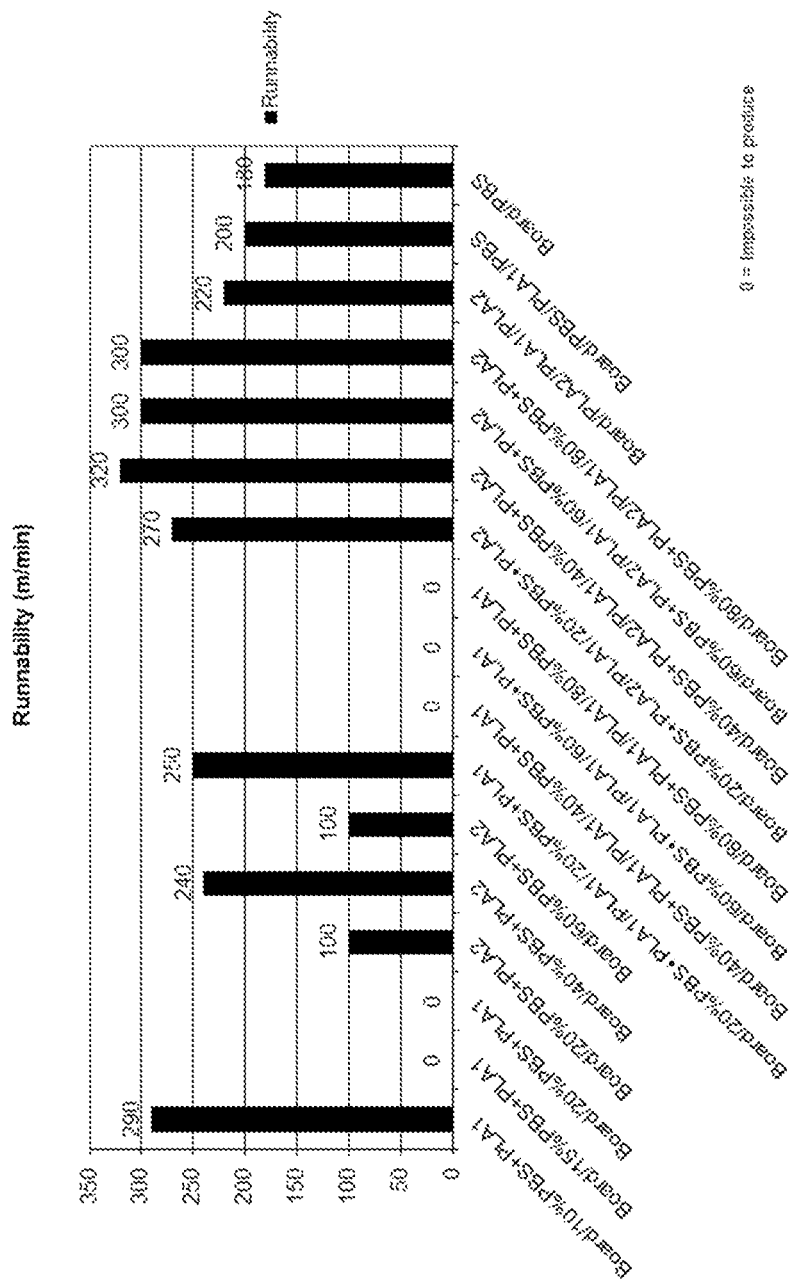
FIG. 1 is a schematic presentation of coating machine speeds (runnability) obtained in various comparative materials and embodiments according to the present invention.

The present invention is based on a surprising finding that extrudability of a PLA-based polymer blend at an extrusion coating machine producing the packaging material can be improved while running speed of the machine, as well as, heat sealability of the polymer-coated material may be preserved by using PLA having a high melt index of more than 35 g/10 min (210° C.; 2.16 kg) as a polymer blend with polybutylene succinate (PBS) or its biodegradable derivate, e.g. poly(butylene succinate adipate) (PBSA).

As an overall rule, the melt index and the molecular weight (MW) of PLA are in reverse ratio to each other, i.e. as the melt index increases the MW decreases. In general, the high melt index PLA as used in the present invention has a MW of less than 160 000, preferably about 100 000. The low melt index PLA as used in multilayer embodiments of the present invention has a MW of at least 160 000, and preferably about 200 000.

A multilayer coating may be produced by extruding onto a fibrous substrate inner, middle and outer coating layers. The inner and outer layers contain a blend comprising polylactide having a melt index >35 g/10 min (210° C.; 2.16 kg) and PBS or its derivate. Optionally the blend may comprise even other components, for instance acrylic copolymers, which shall not destroy the overall biodegradability of the coating layer, however.

The fibrous substrate in the packaging material may be paper or board, paper-board as well as cardboard.

Amount of said polylactide having a melt index >35 g/10 min in said blend is 20-95 wt-%, preferably 30-60 wt-%.

Melt index of said polylactide is >35 g/10 min, preferably >40 g/10 min, and more preferably 50-100 g/10 min, still more preferably 60-90 g/10 min, and most preferably even 70-85 g/10 min (210° C.; 2.16 kg). The inventors have demonstrated that PLA having high melt index allows blending of a higher share of another biodegradable polymer such as polyester to the coating and allows using higher machine speeds in the extrusion process.

Up to now, the PLA used for coating fibrous substrates has in most cases had a molecular weight of about 200 000 g/mol and a melt index at most about 25 g/10 min (210° C.; 2.16 kg). Within the meaning of the present invention, the phrase "high melt index PLA" refers to PLA with a melting index, which is more than 35 g/10 min (210° C.; 2.16 kg), and a molecular weight reduced, preferably by at least about 40%, compared to traditionally used low melt index PLA.

Further, PLA can be produced by using renewable starting material. It is also biodegradable e.g. in composting and can be burned.

Within the meaning of the present invention, the term "biodegradable" means polymers that will decompose in natural aerobic (composting) and anaerobic (landfill) environments. Biodegradation of polymers occurs when microorganisms metabolize the polymer to either assimilable compounds or to humus-like materials that are less harmful to the environment. They may be derived from renewable raw materials, or petroleum-based plastics which contain additives. Aromatic polyesters are almost totally resistant to microbial attack, most aliphatic polyesters are biodegradable due to their potentially hydrolysable ester bonds. Polybutylene succinate (PBS) is an examples of such biodegradable polyesters.

Especially PLA used in the present invention may be of natural origin, i.e. manufactured from renewable natural resources such as corn, potato, tapioca, cellulose, soy protein, lactic acid etc., or can be naturally produced (e.g. by microbial fermentation), and is biodegradable or compostable. Also, PBS and its derivates, such as PBSA, are biodegradable or compostable, but may even be of fossil (petroleum) origin.

Amount of PBS or its derivate in the blend is 5-80 wt-%, preferably 40-70 wt-% and most preferably 45-65 wt-%. Preferably the polymer is PBS, which improves the adhesion properties of the coating layer as well as heat-sealability.

Within the meaning of the present invention, term "adhesion" means adhesion to any surface including fibrous material and polymer coated surface but particularly it means adhesion to raw fibrous material (paper or board) constituting the fibrous substrate. The aim is to achieve complete adhesion, which means that an attempt to detach the coating results in breaking within the fibrous substrate layer, instead of the coating peeling off as a whole.

Within the meaning of the present invention, the term "heat-sealability" means that the polymer coating in softened or melted condition may be attached to an opposite surface of material, which may be the same or another polymer, raw fibrous material etc. A firm seal between the surfaces is formed as the heated polymer cools down and solidifies. When a polymer blend is used in accordance with the invention an acceptable heat-sealing can be achieved within a broader temperature range than in case PLA alone is used.

A major advantage of the method according to the present invention is improved runnability of the coating machinery, i.e. sufficient extrusion and adhesion properties allow using a high machine speed in spite of use of the high melt index PLA.

In the method, the machine speed in extrusion is at least 100 m/min. Preferably the machine speed is at least 150 m/min, more preferably at least 200 m/min, still more preferably at least 250 m/min and most preferably at least 300 m/min. The high machine speed improves the economy of the manufacturing process.

As a preferable third component, the blend may comprise a minor amount, at most about 5% by weight, an acrylate copolymer, such as ethylene butyl acrylate glycidyl methacrylate terpolymer (EBAGMA). The packaging material of the present invention may thus comprise a coating layer consisting of a blend of (i) 30 to 60 weight-% of high melt index PLA, (ii) 40 to 70 weight-%, of PBS or its derivate, and (iii) 0 to 5 weight-% of an acrylate copolymer.

The acrylate polymer is added to further improve the adhesion of the extruded polymer coating layer to the fibrous substrate. Acrylate polymers, including EBAGMA, are as such non-biodegradable, but when used in small amounts of 5 weight-% at most do not prevent disintegration of the coating layer as a whole.

According to the present invention, the preferred biodegradable polymer blended with PLA is polybutylene succinate (PBS). The specific advantage of PBS is superior blendability with high melt index PLA in the extruder, into which PBS and PLA granules may be fed separately.

PBS, or its derivate, blended with PLA improves adhesion of a coating layer consisting of the blend in extrusion onto a fibrous board substrate. At the same time, raw edge penetration of liquid in drinking cups made of the coated packaging material according to the present invention is significantly reduced in comparison with PLA alone, which in case of hot coffee is seen as markedly less, if any, brown colouring along the vertical heat-seal lines in the cup jacket. The improved adhesion is also supposed to increase the ability of the coating to withstand the vapour pressure generated within the fibrous substrate by the hot drink, thus preventing the coating from loosening from the substrate layer and opening pathways to liquid penetration.

In addition to good adhesion and heat-sealing properties and extrudability as PLA blends, PBS and derivates such as PBSA are biodegradable and the blend can be manufactured predominantly from raw materials obtained from renewable natural sources.

A biodegradable polymer blend as discussed above may advantageously be extruded as the uppermost surface layer of the coated packaging material. In this case, PBS or its derivate serves to improve the heat-sealability of the polymer coated packaging material. Addition of a minor amount of acrylate copolymer, such as EBAGMA, further improves heat-sealability of the coating layer.

A biodegradable polymer blend as discussed above may advantageously be extruded into a direct contact with the fibrous substrate of the packaging material. Due to good adhesion properties there is no need to use separate adhesion layers between the fibrous substrate and the coating of the present invention. This simplifies the manufacturing process and reduces raw material costs. PBS or its derivate serves to improve adhesion of the coating layer to the underlying fibrous substrate. In the multilayer coating, said coating layer is the lowermost layer.

In the coextruded multilayer coating, each layer should substantially consist of biodegradable polymers, which preferably are based on renewable raw materials. The material may have a polymer coating on one side or on both sides thereof. The coatings on the opposite sides of the fibrous substrate may be similar or differ from each other, for instance a multilayer coating on one side and a monolayer coating on the opposite side.

According to the present invention, the components of the blend are melted and blended in connection with the extrusion step, more specifically the components of the polymer blend are mixed as granules and melted at a single step, immediately followed by extrusion of the melt onto a paper or board substrate. This works especially well with PLA and PBS or its derivate. Mixing of the components first in the extruder allows easy adjustment of the respective shares of the components being mixed, an advantage over use of premade compounded blends. Availability of granulate PLA and polyesters is good and typically also the price is lower compared to pre-mixed blends.

The total amount of polymer coating on one side of the fibrous substrate may be in the range of 10-60 g/m$^2$, typically about 25 g/m$^2$. In a multilayer coating the amount of polymer per layer may be 4-20 g/m$^2$, preferably 6-15 g/m$^2$. A representative example could be a triple layer coating with a middle layer of solely low melt index PLA and coating layer weights of 7, 11 and 7 g/m$^2$, respectively.

A useful embodiment of the present invention is a packaging material comprising a fibrous substrate and one or more extruded polymer coating layers including at least one layer of a polymer blend consisting of (i) 20-95 wt-% of polylactide having a high melt index of more than 35 g/10 min (210° C.; 2.16 kg), (ii) 5-80 wt-% of polybutylene succinate (PBS) or a biodegradable derivate thereof, and (iii) 0-5 wt-% of one or more polymeric additives.

A preferred embodiment of the present invention is a fibrous paper or board-based packaging material comprising coextruded inner, middle and outer coating layers, the inner and outer layer comprising a blend of 20-95 wt-% of PLA having a melt index of above 35 g/10 min (210° C.; 2.16 kg), 5-80 wt-% of PBS or its biodegradable derivate and, optionally, 0-5 wt-% of an acrylic copolymer such as EBAGMA, and the middle layer comprising polylactide having a melt index of 5-35 g/10 min (210° C.; 2.16 kg). The inner layer would provide superior adhesion in extrusion to the fibrous substrate and the outer layer would provide superior heat-sealability to an uncoated fibrous surface or to a polymer layer, similar or dissimilar to said outer heat-seal layer itself. Middle layer containing PLA with low melting index supports the polymer layers during extrusion process. PLA is also renewable and useful material having e.g. good moisture barrier properties as well as low cost. Multilayered structure allows optimizing the raw material without compromising the extrudability or properties of the resulting coating.

In a more preferred embodiment, said packaging material comprises a fibrous substrate and an extruded multilayer coating including innermost and outermost layers of a blend of 30-60 wt-% of polylactide having a melt index of 50-100 g/10 min (210° C.; 2.16 kg), 40-70 wt-% of PBS or derivate, and 0-5 wt-% of an acrylic copolymer, and a middle layer of polylactide having a melt index of 5-35 g/10 min (210° C.; 2.16 kg). The same blend is advantageously used for the innermost and outermost layers.

The present invention further provides improved containers made of the packaging material as described above. Disposable drinking cups for hot drinks, especially hot coffee, are a prime example of such containers.

According to the present invention, a drinking cup made of a packaging material manufactured by the method of the present invention, or of a packaging material of the present invention, has the polymer coating lying on the inner liquid-contact side of the cup.

According to the present invention, a sealed liquid package of a packaging material manufactured by the method of the present invention, or of a packaging material of the present invention, has the polymer coating lying on the inner liquid-contact side of the package. However, a similar package may even be used as a carton package for dry products.

According to the present invention, a sealed carton package of a packaging material manufactured by the method of the present invention, or of a packaging material of the present invention, may have the polymer coating lying on the outside of the package.

According to the present invention, a tray package for ready-made food, the tray being made of a packaging material manufactured by the method of the present invention, or of a packaging material of the present invention, has the polymer coating lying on the food-contacting upper side of the tray.

The product packages according to the present invention are preferably completely made of the packaging material as described above. In each case even the reverse side of the packaging material may be polymer-coated, e.g. for improving heat-sealability or for gas or aroma barrier purposes.

EXAMPLES

FIGS. 6a-6e show as examples five structural embodiments of packaging materials according to the present invention. "PLA1" means low melt index PLA; "PLA2" means high melt index PLA; "PBS" means polybutylene succinate and "board" indicates the fibrous substrate layer, which is paper, paperboard or cardboard. Instead of PBS, even biodegradable derivates of PBS may be used.

There are extruded or coextruded monolayer or multilayer coatings of a blend of PLA2 and PBS and mere PLA1 on one side or on both sides of a fibrous paper or board substrate ("board"). The share of PLA2 in the blend is 20 to 95 weight-%, preferably 30 to 60 weight-%, and the share of PBS may vary from 5 to 80 weight-%, preferably being 40 to 70 weight-%. As an optional third component at most 5 weight-% of an acrylate copolymer such as ethylene butyl acrylate glycidyl methacrylate terpolymer (EBAGMA) may be included in the blend. The substrate may be paper, paperboard or cardboard of a weight of 40 to 350 g/m$^2$, preferably a cupboard or a liquid package board of 170 to 350 g/m$^2$.

It is understood by a skilled reader that if the packaging material has extruded polymer coatings on both sides, the coatings on the opposite sides need not be identical. There may be a mono-layer coating on one side and a multilayer coating on the other side of the fibrous substrate. It is also possible to include in multilayer coatings layers of other biodegradable polymers suitable for extrusion coating, preferably in blends with high melt index polylactide.

Usefully PBS is available as a commercial product under trade name GsPLA FZ91PD by Mitsubishi, and EBAGMA is commercially available under trade name Biomax Strong 120 by DuPont.

More particularly, FIG. 6a shows the substrate 1 with a single extruded coating layer 2 of the blend of PLA2 and PBS. The weight of this monolayer 2 may be from 10 to 30 g/m$^2$. In FIG. 6b there is such a PLA2+PBS blend layer 2 on both sides of the substrate 1.

FIG. 6c shows a coextruded multilayer coating with an innermost PLA2+PBS blend layer 2, a middle layer 3 of PLA1, and an outermost PLA2+PBS blend layer 4. The weight of each of the three layers 2, 3, 4 may be from 4 to 13 g/m$^2$. The total weight of the multilayer coating is thus 12-39 g/m$^2$. Including a middle layer 3 of PLA1 serves to add to the total thickness of the coating while improving its extrudability. FIG. 6d shows similar multilayer coatings 2, 3, 4 on both sides of the substrate 1.

FIG. 6e shows a packaging material comprising a board substrate 1 and coextruded innermost, middle and outermost coating layers 2, 3, 5. Only the innermost layer 2 consists of a PLA2+PBS blend as described above. The middle layer 3 consists of mere PLA1. The outermost heat-sealing layer 5 comprises a blend of about 45 weight-% of PLA2 and 55 weight-% of polybutylene adipate terephthalate (PBAT). The weights of the three coating layers 2, 3, 5 may correspond to the respective layers 2, 3, 4 in the embodiment of FIG. 6c.

If the packaging material has extruded polymer coatings on both sides, the coatings on the opposite sides need not be identical. There may be a monolayer coating on one side and a multilayer coating on the other side of the fibrous substrate. It is also possible to include in multilayer coatings layers of other biodegradable polymers suitable for extrusion coating, preferably in blends with PLA2. FIG. 6e is an example of such embodiments. In addition to PBAT, other examples of useful polymers are PHA (polyhydroxy alkanoate), PHB (polyhydroxy butyrate), PHBV (polyhydroxybutyrate hydroxyvalerate), PGA (polyglycolic acid), PEG (polyethylene glycol), PCL (polycaprolactane), and starch based biopolymers. The innermost layer of the multilayer structure shall be of the blend containing PLA and PBS or its derivate, however.

TESTS

In the following, the present invention is illustrated by means of laboratory tests. Extrusion grade polylactides having "low" or "high" melt indexes (see Table 1 below) and polybutylene succinate (PBS) were used as coating polymers as such or blended as shown in Table 2. The blends as well as pure PLA (used also as a reference) were then extruded as monolayers or as three layered structures onto one side of a board substrate having a weight of 280 g/m². True coating weights in both monolayer and three layer structures were measured. Due to the coating techniques they varied slightly, between 24.9 and 27.6 g/m² (about 25 g/m²).

TABLE 1

Characteristics of the polymers used in experimental part.

| Polymer | melting index | temperature |
|---|---|---|
| PLA1 | 25 g/10 min; "low" | 210° C. |
| PLA2 | 75 g/10 min; "high" | 210° C. |
| PBS | 4.5 g/10 min | 190° C. |

For each coated test material the runnability of the coating machine and adhesion and heat-sealing properties of the resulting coating were measured.

Adhesion to the board substrate was determined on a scale from 0 to 5, the highest figure representing the best adhesion. The polymeric coatings were thus introduced onto the substrate by extrusion, and their adhesion to the board surface was defined on said scale, whereby the classification was as follows:
1=no adhesion, the polymeric layer peels off;
2=poor adhesion, some fibres are stuck to the polymeric layer that peels off;
3=poor adhesion, when detaching the polymeric layer, less than 50% of the paper board breaks in the area of coating;
4=moderate adhesion, when detaching the polymeric layer, over 50% of the paper board breaks in the area of coating;
5=perfect adhesion, when detaching the polymeric layer, the paper board breaks throughout the area of coating.

Heat-sealability is given as the lowest sealing temperature providing successful sealing between the heat-seal layer and a countersurface, in the tests the heat-seal layer itself. The criterium is that an attempt to tear open the seal results in a break in the fibrous board substrate instead of opening of the seal.

Runnability is given as the lowest operable machine speed in extrusion or coextrusion.

TABLE 2

The adhesion, heat-sealablity and runnability (coating machine speed) results of monolayer and three layer coatings applied on board substrate. PLA1 is conventionally used PLA having melt index (about 25 g/10 min) and PLA2 has high melt index (about 75 g/10 min). Column at right, when appropriate, refers to the general structure as shown in FIG. 6.

| | Adhesion | Heat-sealability (° C.) | Runnability (m/min) | Fig. |
|---|---|---|---|---|
| Board/10% PBS + PLA1 | 4 | 440 | 290 | |
| Board/15% PBS + PLA1 | — | — | — | |
| Board/20% PBS + PLA1 | — | — | — | |
| Board/20% PBS + PLA2[(1)] | 4.5 | 380 | 100 | 6a |
| Board/40% PBS + PLA2[(1)] | 4.5 | 400 | 240 | 6a |
| Board/60% PBS + PLA2[(1)] | 4 | 410 | 100 | 6a |
| Board/20% PBS + PLA1/ PLA1/20% PBS + PLA1 | 5 | 460 | 250 | |
| Board/40% PBS + PLA1/ PLA1/40% PBS + PLA1 | — | — | — | |
| Board/60% PBS + PLA1/ PLA1/60% PBS + PLA1 | — | — | — | |
| Board/80% PBS + PLA1/ PLA1/80% PBS + PLA1 | — | — | — | |
| Board/20% PBS + PLA2/ PLA1/20% PBS + PLA2[(1)] | 5 | 410 | 270 | 6c |
| Board/40% PBS + PLA2/ PLA1/40% PBS + PLA2[(1)] | 5 | 410 | 320 | 6c |
| Board/60% PBS + PLA2/ PLA1/60% PBS + PLA2[(1)] | 5 | 380 | 300htd | 6c |
| Board/80% PBS + PLA2/ PLA1/80% PBS + PLA2[(1)] | 4 | 360 | 300 | 6c |
| Board/PLA2/PLA1/PLA2 | 4 | 390 | 220 | |
| Board/PBS/PLA1/PBS | 4 | 350 | 200 | |
| Board/PBS | 4 | 350 | 180 | |
| Board/PLA2 | 3 | 390 | poor | |

[(1)]signifies examples according to the invention, the other examples are comparative.

Lack of result implies failure in testing and thus unworkability.

The runnability results (coating machine speed) are shown in FIG. 1. It was proved that the machinery was unable to handle high (>40%) PBS concentrations by using conventional PLA (PLA1) whereas replacing conventional PLA (PLA1) with high melt index PLA (PLA2) and/or 3-layer structure (PLA1 layer in the middle and PLA2+PBS in inner and outer layer) resulted in superior runnability. Also monolayered structure using PLA2, especially when blended with 40% of PBS, had good runnability. Coating could not be successfully done solely with PLA2.

Figure 2:
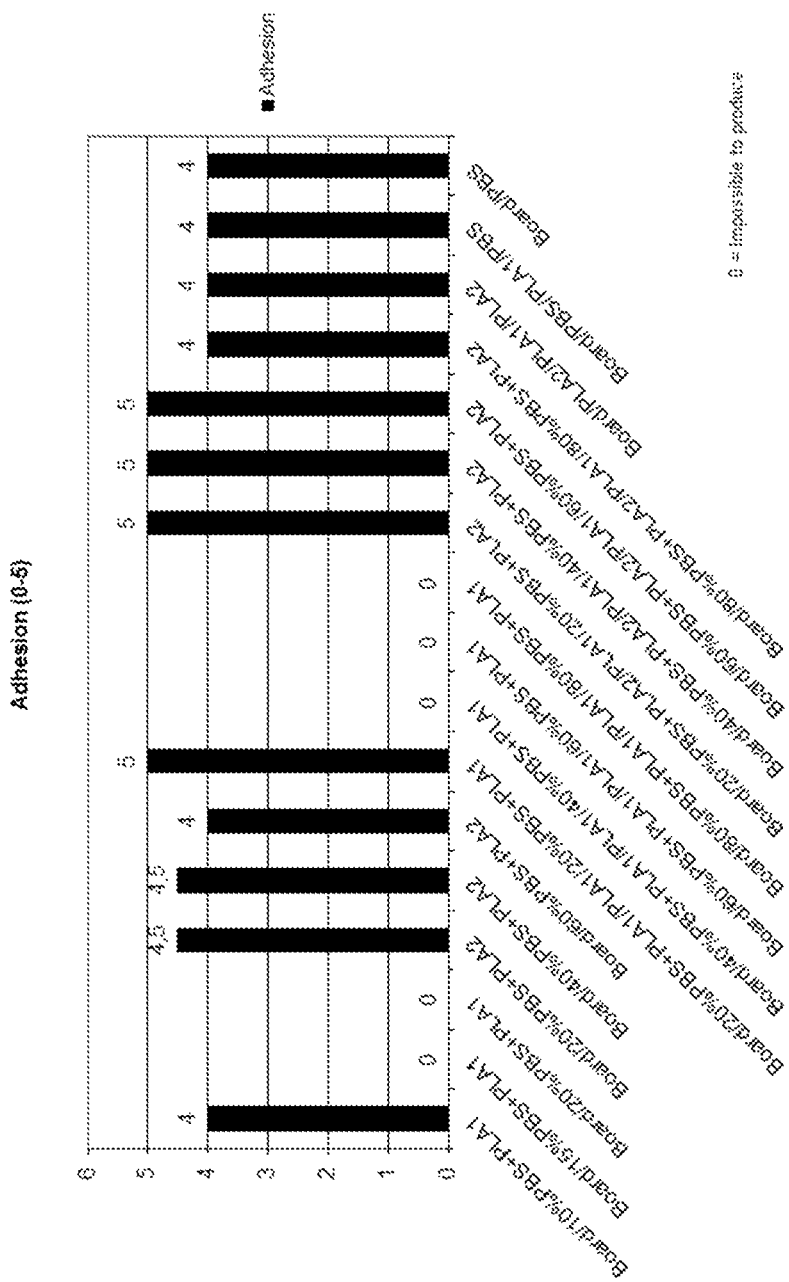
FIG. 2 is a schematic presentation of adhesion properties obtained in various comparative materials and embodiments according to the present invention.

The adhesion results are shown in FIG. 2. In each case use of high melt index PLA in combination with PBS improved the adhesion value. No improvement was detected after 20% PBS concentrations.

Figure 3:
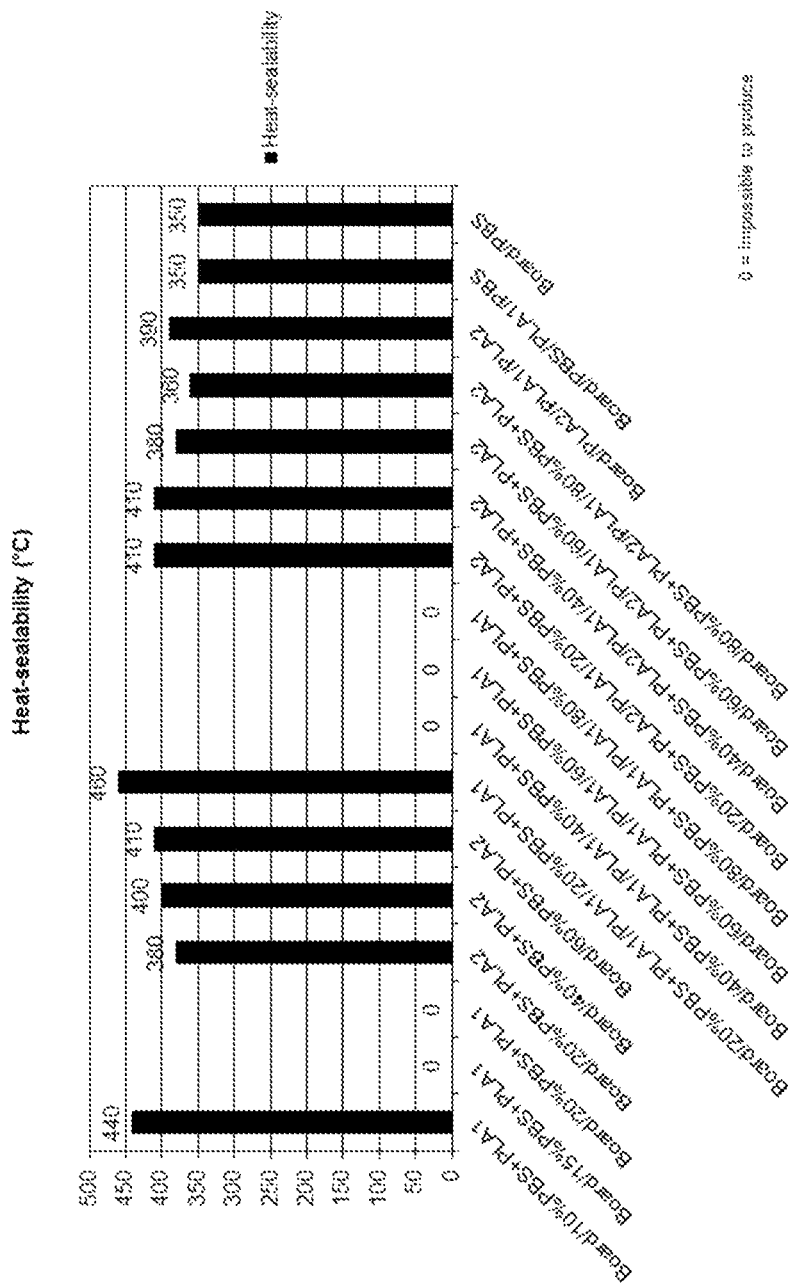
FIG. 3 is a schematic presentation of heat-sealing properties obtained in various comparative materials and embodiments according to the present invention.
Figure 4:
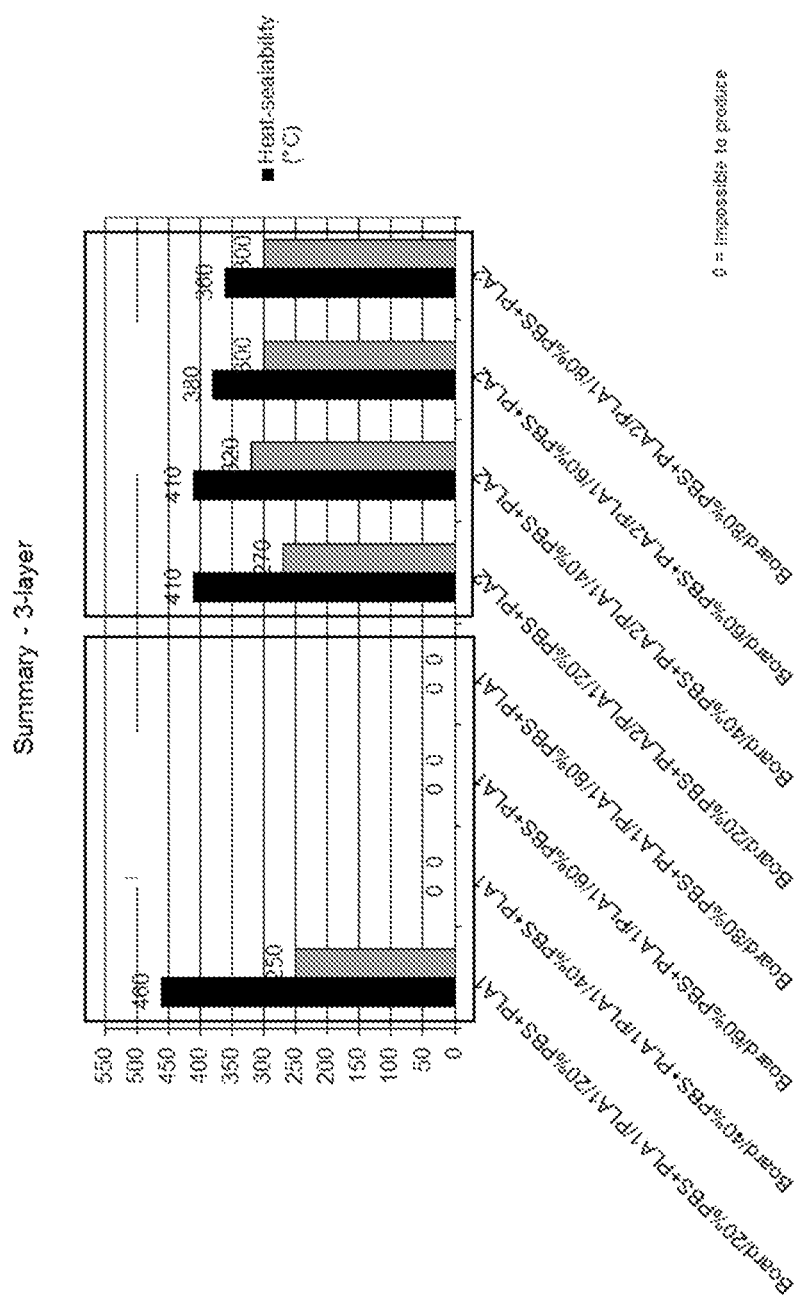
FIG. 4 is a schematic summary of properties of three-layered structures according to the present invention.
Figure 5:
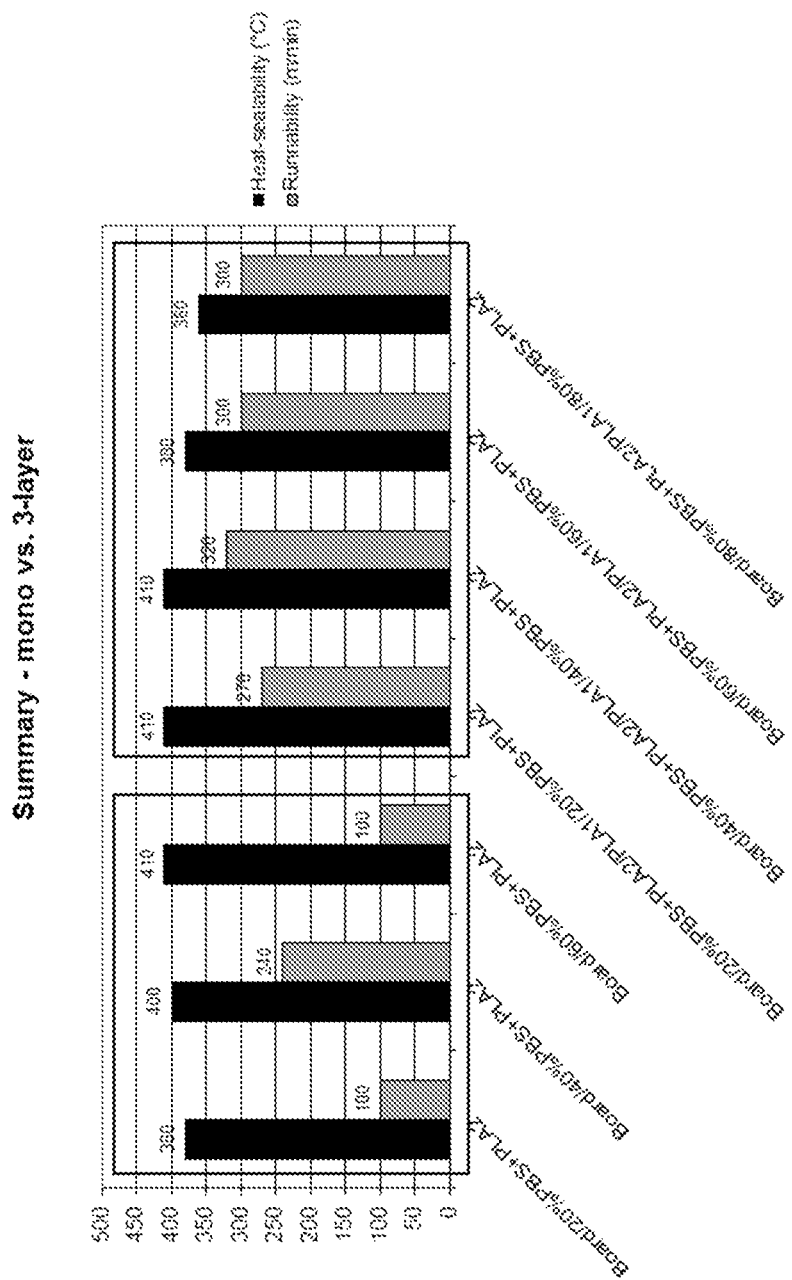
FIG. 5 compares schematically the properties of comparative monolayered structures and three layered structures according to the present invention.

Heat-sealability results are shown in FIG. 3 and show that using high melt index PLA the heat-sealability is significantly improved, c.f. the lower heat-sealing temperatures. In addition it was found that a blend comprising high melt index PLA and PBS can be heat-sealed in a broad temperature range thereby providing flexibility to process (data not shown).

The three layered coating structures (FIG. 6c), where PLA1 is used in the middle layer and PLA2 is blended with PBS in the innermost and outermost layers, were found to be especially beneficial by enabling the highest coating machine speed (runnability) and excellent heat-sealing and adhesion properties. It is believed that PLA1 in the middle layer gives rigidity to film.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the present invention be defined by the attached claims and their legal equivalents, as well as the following illustrative embodiments.

The invention claimed is:

1. A method of manufacturing a biodegradable packaging material, the method comprising:

extruding one or more polymer coating layers onto a fibrous substrate, the one or more polymer coating layers including at least one layer of a non-aromatic polymer blend, the at least one layer of non-aromatic polymer blend consisting of (i) 20-95 wt-% of polylactide (PLA) having a high melt index of more than 35 g/10 min (210° C.; 2.16 kg), (ii) 5-80 wt-% of polybutylene succinate (PBS) or a biodegradable derivate thereof, and (iii) greater than 0 wt-% and up to 5 wt-% of ethylene butyl acrylate glycidyl methacrylate terpolymer, wherein the PLA and the PBS or the biodegradable derivate thereof are fed into the extruder as granules, and the components of the polymer blend are melted and blended in connection with the extrusion step.

2. The method of claim 1, wherein said polymer blend consists of (i) 30-60 wt-% of said high melt index polylactide, (ii) 40-70 wt-% of said polybutylene succinate or said biodegradable derivate thereof, and (iii) greater than 0 wt-% up to 5 wt-% of said ethylene butyl acrylate glycidyl methacrylate terpolymer.

3. The method of claim 1, wherein said high melt index polylactide has a melt index of 50-100 g/10 min (210° C.; 2.16 kg).

4. The method of claim 1, wherein said polymer blend is extruded as an outermost heat-sealable layer of a multilayer coating.

5. The method of claim 1, wherein said polymer blend is extruded as an innermost adhesive layer of a multilayer coating.

6. The method of claim 4, wherein said multilayer coating comprises an innermost layer of said polymer, an outermost layer of said polymer blend, and a middle intermediate layer between said innermost and outermost layers, said middle intermediate layer containing polylactide having a low melt index of 5-35 g/10 min (210° C.; 2.16 kg).

7. The method of claim 6, wherein the same polymer blend is extruded as the innermost and the outermost layer of the multilayer coating.

8. The method of claim 1, wherein a monolayer coating is extruded into direct contact with the fibrous substrate.

9. The method of claim 1, wherein the machine speed in extrusion is at least 100 m/min.

10. The method of claim 1, wherein said high melt index polylactide has a melt index of 70-85 g/10 min (210° C.; 2.16 kg).

11. The method of claim 5, wherein said multilayer coating comprises an innermost layer of said polymer blend, an outermost layer of said polymer blend, and an intermediate middle layer between said innermost and outermost layers, said intermediate middle layer containing polylactide having a low melt index of 5-35 g/10 min (210° C.; 2.16 kg).

12. The method of claim 9, wherein the machine speed in extrusion is at least 250 m/min.

13. The method of claim 1, further comprising forming said one or more polymer coating layers extruded onto said fibrous substrate into a consumable product chosen from a drinking cup, a sealed liquid package, a sealed carton package, and a tray package for ready-made food.

14. The method of claim 13, wherein said one or more polymer coating layers are located on an inner liquid-contact side of said drinking cup, an inner liquid-contact side of said sealed liquid package, an outside of said sealed carton package, or a food contact side of said tray package for ready-made food.

* * * * *